United States Patent [19]

McMinn et al.

[11] Patent Number: 4,993,058
[45] Date of Patent: Feb. 12, 1991

[54] PHONE ACTIVATED EMERGENCY SIGNALING SYSTEM

[76] Inventors: Edward W. McMinn, Rte. 1, Box 406, Paragould, Ark. 72450; Thomas L. Lloyd, 2010 Rosemond; Jack Middleton, 726 W. Washington, both of Jonesboro, Ark. 72401

[21] Appl. No.: 415,779

[22] Filed: Oct. 2, 1989

[51] Int. Cl.⁵ .......................................... H04M 11/04
[52] U.S. Cl. ...................................... 379/37; 379/386; 379/396; 340/332
[58] Field of Search ........................... 379/36–38, 379/40, 45, 49, 51, 104, 105, 188, 199, 200, 354, 386, 396; 340/331, 332

[56] References Cited

U.S. PATENT DOCUMENTS

| | | | |
|---|---|---|---|
| 3,798,375 | 3/1974 | Delisle | 379/40 |
| 3,860,762 | 1/1975 | Klaiber et al. | 379/200 X |
| 4,003,040 | 1/1977 | Browand | 340/332 |
| 4,425,480 | 1/1984 | Lischin | 379/200 |
| 4,547,761 | 10/1985 | Jones | 340/331 |
| 4,587,753 | 5/1986 | Harper | 340/331 X |
| 4,611,265 | 9/1986 | Davis | 362/145 |
| 4,686,505 | 8/1987 | Vanderburg | 340/331 |
| 4,791,658 | 12/1988 | Simon et al. | 379/104 X |
| 4,878,236 | 10/1989 | Ray et al. | 379/37 |

OTHER PUBLICATIONS

Hasten Systems, Greensboro, North Carolina, "The Hasten 500–911", Owner Manual © 1987.

Primary Examiner—Jin F. Ng
Assistant Examiner—Wing F. Chan
Attorney, Agent, or Firm—Stephen D. Carver

[57] ABSTRACT

An illuminated house light display system and a telephone operated emergency indicator device for activating the display. The circuit responds to the dialing of the numeric emergency sequence "9-1-1" and the test sequence "#-9-1-1" and activates the display to provide a visual warning signal to guide summoned emergency personnel. Reset may be accomplished anytime by lifting the handset and dialing a "#." The generally cubical address display is externally mounted in a clearly visible place. The illuminated display comprises a resilient housing preferably fitted with a translucent, marked screen bearing the appropriate indicia. A bright strobe warning light is housed within the address box. The electronic circuit is mounted within a control box, and it is interconnected with the telephone line via a conventional jack. The circuit comprises a decoder which senses the dialing of digits, and an Initiation circuit interconnected with the decoder. The initiaition circuit comprises a counter, a recognition circuit, and a gate logic circuit for actuating an incrementer when the target dialing sequence occurs. The initiation circuit recognizes the symbol #, which may be dialed at the beginning of a test string of numbers to test telephone equipment. Thus the test sequence #-9-1-1 may be dialed to test the apparatus, without completing an emergency call. A disabling circuit enables a user to hang up the phone after summoning help and make a subsequent call, without stopping the alarm state.

19 Claims, 3 Drawing Sheets

PHONE ACTIVATED EMERGENCY SIGNALING SYSTEM

BACKGROUND OF THE INVENTION

The present invention relates both to telephone-activated alarm systems and to illuminated address display fixtures. More particularly, the present invention relates to residential address display fixtures which are equipped with emergency signaling apparatus to alert local authorities and neighbors when an emergency situation results. The instant invention relates further to alarm-equipped signaling devices which are activated by telephone.

The prior art reflects numerous illuminated housings or fixtures which display certain indicia. For example, it has long been known to provide a generally cubical enclosure with some form of lighting system to backlight numbers or letters displayed on a front side. In this manner, particularly at night, passers-by may readily see the street address of a building equipped with the apparatus. Illuminated indicia-displaying signs of this general nature are seen in U.S. Pat. No. 1,786,155 issued Dec. 23, 1930 to Farrell and U.S. Pat. No. 4,201,005, issued to Hunt on May 6, 1980. U.S. Pat. No. 4,254,457, issued Mar. 3, 1981 to Lordier, discloses a basic illuminated display for house numbers. An internal incandescent bulb disposed within a generally box-like enclosure illuminates a front face member with numerals indicating the address.

It is also known to combine a basic house address display device with an emergency flashing light. For example, U.S. Pat. No. 4,611,265 issued to Davis on Sept. 9, 1986, discloses an address display system in which the house numerals are disposed on a translucent wall illuminated by a conventional internal bulb. A flashing emergency light is also disposed within the housing. The emergency light may be actuated by the occupant from a remote switch within the residence to warn passers-by of the need for assistance. A reflector is associated with the emergency light. U.S. Pat. No. 4,587,753 issued May 13, 1986 to Harper provides an indicia display system which flashes a red light to warn of an emergency situation within the house.

However, structure disclosed by the aforementioned prior art patents must typically be activated by the user from a remote switch located somewhere within the house. Unfortunately, it is unlikely that the average person confronted with an actual emergency would remember to activate the light switch. Moreover, in the event the path to the switch were blocked, as by smoke or fire, the person may be unable to reach the apparatus. And, a visitor or person unacquainted with the residence or the particular alarm system probably would not realize that the system existed.

Hence it would seem desirable to provide an emergency light signal which is automatically activated in response to behavior typically associated with an emergency situation. Suggestion for a response-oriented system is found in the Skarman U.S. Pat. No. 4,570,155, issued Feb. 11, 1986. Therein is disclosed a portable emergency light which is activated in response to an audible smoke alarm signal. The light may be selectively positioned to assist users to escape from smoke-filled or darkened buildings.

With the recent widespread deployment of the 9-1-1 emergency telephone system, the first response of the average person to an emergency may be to simply pick up the telephone and dial the numbers 9-1-1. Further, such a response might be typical of visitors or other strangers to a residence who may find themselves in an emergency situation, especially where panic or extreme stresses are encountered. Hence we have provided a system for generating an emergency signal in combination with a house lighting system, which automatically generates an emergency warning signal when the telephone number 9-1-1 is dialed.

SUMMARY OF THE INVENTION

The present invention comprises an illuminated house light display system which is combined with a telephone operated emergency indicator device. The display system responds to the dialing of various numeric sequences such as the emergency sequence 9-1-1, and can generate a visual warning signal to guide summoned emergency personnel or warn neighbors.

The invention preferably comprises a generally cubical address display unit adapted to be externally disposed upon the residence or building in a clearly visible place. The display unit comprises a resilient housing preferably fitted with a translucent, marked board bearing the appropriate address. Conventional incandescent bulbs are preferably employed to illuminate the address numbers so as to make them readily discernible, especially at night or in the evening. Additionally, a very bright strobe warning light is preferably employed with the address box. Means are provided to actuate the alarm strobe in an emergency in response to the dialing of 9-1-1.

An electronic sensing circuit interconnected with the residence telephone lines is disposed within the dwelling. Preferably the circuit is mounted within a control box, and it is interconnected with the telephone line with a conventional jack. Ideally, however, the control box includes a additional female jack, so that the user's telephone may be connected to the phone line by plugging into the control box. When an alarm condition results, the occupant may dial the emergency numbers 9-1-1 to summon aid, and the electronic circuit within the control box will respond by activating the remote alarm. Thus when the telephone number 9-1-1 is dialed, the bright strobe within the address light will automatically activate. If a non-emergency number is dialed, and it happens to include the digits 9 or 1, no alarm condition is sensed.

The electronic circuit comprises a decoder which senses the dialing of digits. Initiation means interconnected with the decoder generates appropriate signals for processing logic. The initiation means actuates an incrementer when the digits 9-1-1 are the first digits of a dialed sequence, which, when properly incremented, activates a transistor switch to turn on the alarm.

The initiation means preferably comprises recognition means interconnected with the decoder means for recognizing the dialing of digits within the alarm sequence, and a counter for determining the order that digits have been dialed. Logical gates interconnected with the recognition and counter circuits are employed for triggering the incrementing means each time a correct dialed digit occurs in a correct order. The gate circuit preferably comprises an AND gate circuit directly connected to the recognition circuit and the counter, and an OR gate controlled by the AND gates which outputs to the incrementing circuit.

Additionally, the circuit recognizes the symbol "#," which may be dialed at the beginning of a test string of numbers to test telephone equipment without completing a telephone connection. Thus the test sequence #-9-1-1 may be dialed to test the apparatus, without completing an emergency call. Installation may thus be checked without summoning emergency aid. A reset circuit allows the symbol "#" to be dialed alone to reset the system. In the preferred mode the reset circuit recognizes when the 9-1-1 call is made and hang-up thereafter occurs. At this time the system will not be reset and thus the strobe alarm will continue to operate.

Thus a primary object of the present invention is to provide a telephone operated emergency signaling device.

A similar object is to provide an address light system with an emergency, telephone activated, signaling device.

Another basic object is to provide a warning system of the character described which an occupant may activate merely by dialing his telephone.

More specifically, it is a fundamental object of the present invention to provide a residential emergency warning device which is activated when someone inside the dwelling dials the telephone number 9-1-1.

Another object is to provide a system of the character described which may be plugged into any available telephone outlet.

Another important object of our invention is to provide a warning system of the character described which will function automatically in response to outgoing emergency phone calls, whether or not the caller is aware of the existence of the system, or is within the proximity of the control unit.

Another object of the present invention is to provide a telephone responsive warning system of the character described which will enable the user to make subsequent telephone calls while the alarm state is maintained.

Yet another object of the present invention is to provide a telephone activated alarm system of the character described which allows the user to dial a test sequence (i.e. #-9-1-1), so that a user need not actually be connected with emergency assistance in order to check the unit.

A related object is to provide a telephone activated alarm system of the character described which allows the user to dial a reset sequence (i.e. the symbol #) to reset the alarm.

These and other objects and advantages of the present invention, along with features of novelty appurtenant thereto, will appear or become apparent in the course of the following descriptive sections.

BRIEF DESCRIPTION OF THE DRAWINGS

In the appended drawings, which form a part of the specification and which are to be construed in conjunction therewith, and in which like reference numerals have been employed throughout wherever possible to indicate like parts in the various views.

DETAILED DESCRIPTION

Figure 1:
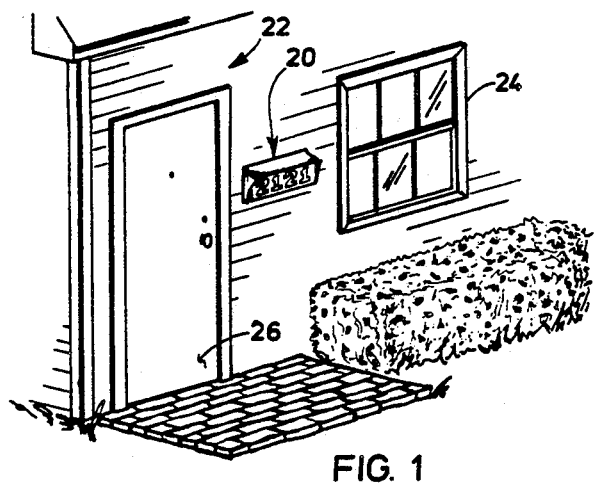
FIG. 1 is a fragmentary, pictorial view showing the address light of the present invention mounted in a preferred remote position upon the home of the user adjacent an entry-way.
Figure 2:
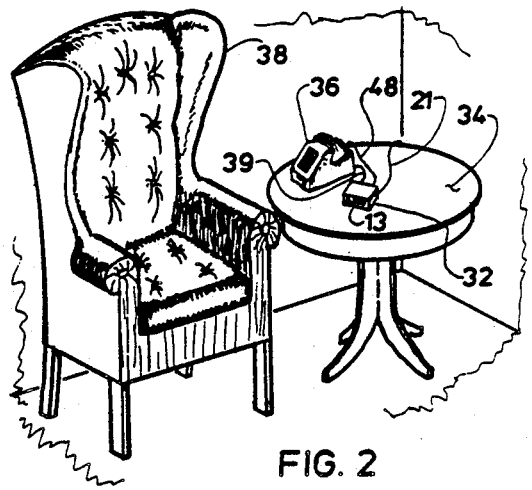
FIG. 2 is a fragmentary, pictorial view illustrating the circuit control box of our PHONE ACTIVATED EMERGENCY SIGNALING SYSTEM in an accessible position within the residence adjacent a chair.
Figure 3:
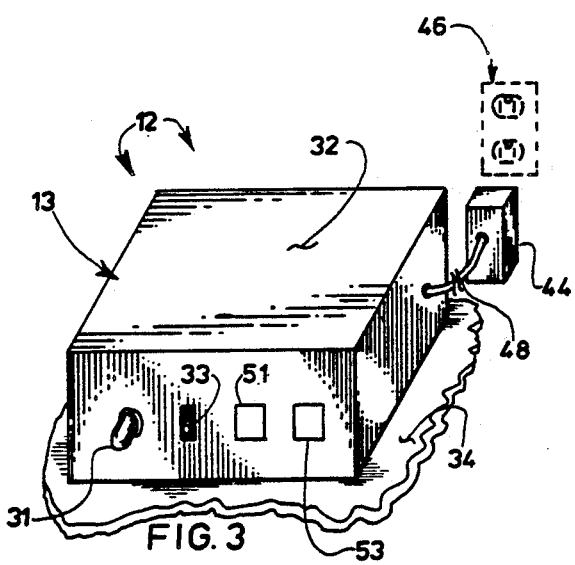
FIG. 3 is a fragmentary pictorial view of the preferred control box.

With initial reference now directed to FIGS. 1–3 of the drawings, system 12 responds to certain telephone-dialed sequences. As used herein the term "Emergency Sequence" will refer to the sequentially dialed numbers 9-1-1. The term "test sequence" will refer to the dialed sequence #-9-1-1. The term "reset sequence" will refer to the dialing of the symbol #. It should further be appreciated that the system may easily be adapted to recognize other dialed sequences.

Figure 8:
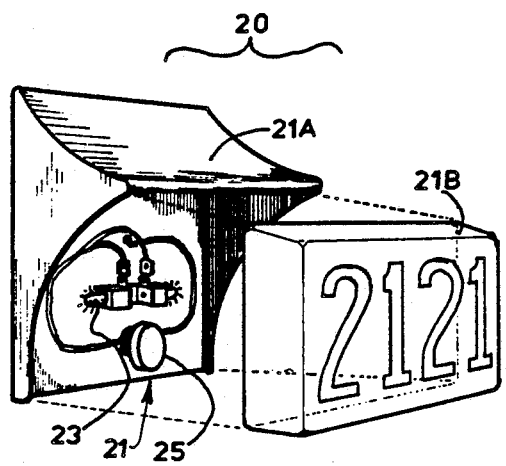

System 12 comprises a control box 13 which is disposed within the user's residence or building, and a remote address light 20. The address light 20 preferably comprises a metallic housing 21A, to which is fitted a generally translucent, indicia-bearing number plate 21B (FIG. 8). Light 20 is preferably disposed near a window 24 or a door 26 so that, as will be hereinafter explained, unit testing may be easily carried out.

The address light may comprise a Sparkle Plenty brand illuminated lighting fixture which has been appropriately modified with the addition of the strobe to be hereinafter described. Conventional incandescent bulbs 23 (FIG. 8) are disposed interiorly of the address light 20 to back light the address numbers on plate 21B. The high intensity strobe 25 is actuated to indicate an emergency condition. The alarm condition is also signaled by LED D4 (FIG. 6) visible through red alarm indicator 31 (FIG. 3) in housing 32. Switch 33 (FIG. 3) is the manual alarm switch. Optional windows 51 or 53 may expose the pilot lighting effectuated by LED's 49 (FIG. 4) or 73 (FIG. 5).

An electronic circuit, generally designated by the reference numeral 30 (FIG. 6) is preferably housed within the control box 13. The control box may be conveniently disposed upon a table 34 or other article of furniture, preferably adjacent a conventional push button telephone 36. An occupant seated within chair 38, for example, may easily activate either the telephone 36 or the control box 13. As explained hereinafter, the control box may be manually manipulated to initiate the alarm condition with switch 33. Alternatively, the user need merely dial the numbers 9-1-1 or the test sequence #-9-1-1 on the telephone to activate the alarm. The control box 13 is normally plugged into a conventional telephone jack via line 21. The telephone 36 may in turn be coupled to the control box by a jack (not shown) in housing 32 via a line 39. However, the control box need not be disposed adjacent or near the telephone 36. The system will function as long as it is correctly wired to the address light 20 and plugged into the telephone line in any available working outlet within the residence.

Figure 4:
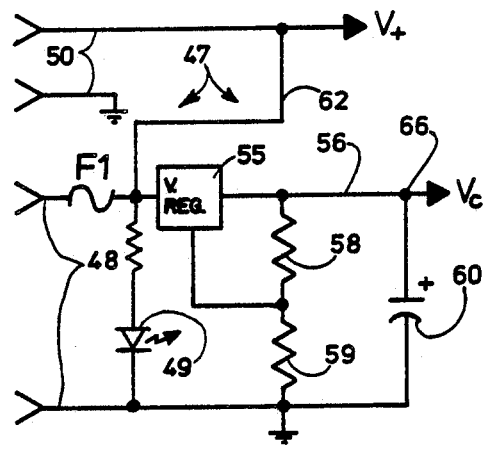
FIG. 4 is an electrical schematic diagram showing the preferred power supply for the system, which incorporates a conventional 12 V.D.C. wall transformer.

The preferred power supply has been generally designated by the reference numeral 47 (FIG. 4). A twelve-volt direct current wall transformer 44 (FIG. 3) may be plugged into an available A.C. outlet 46. Twelve volts D.C. is outputted via lines 48 to the power supply 47. A suitable rechargeable backup battery may be plugged into lines 50, and line 62 interconnects the backup battery for trickle charging. The battery is preferably located in the control box. Voltage appearing across lines 48 is transmitted through fuse F1 to a voltage regulator 55. The output of the voltage regulator appears on line 56, developed across resistors 58, 59 and filter capacitor 60. Output voltage appearing at node 66 is appropriately delivered to the phone line logic circuit as will be described in conjunction with FIG. 6. LED 49 functions as a pilot light, and it is activated from voltage appearing across lines 48.

Figure 5:
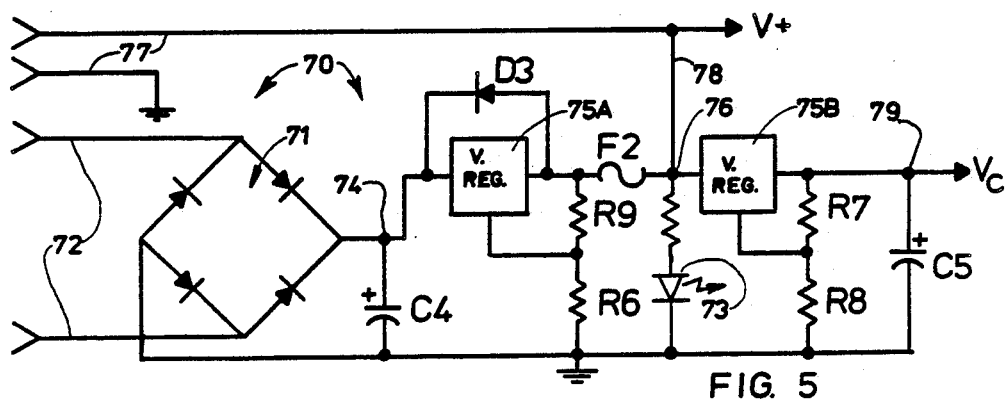
FIG. 5 is an electrical schematic diagram of an alternative power supply which uses a 16 V.A.C. wall transformer.

An alternative power supply 70 has been illustrated in FIG. 5. Power supply 70 is adapted to be employed with a conventional sixteen volt alternating current wall transformer which applies 16 volts alternating current across lines 72. The conventional bridge rectifier 71 outputs pulsating direct current to node 74 for filtering and regulation. Regulated voltage available via series regulator 75A and fuse F2 appears on node 76. A backup battery (not shown) may be connected across lines 77, and it will be trickle charged via line 78. Regulated output current is delivered via a second series regulator 75B to output node 79. Output voltage is developed across resistors R7 and R8 and across filter capacitor C5. LED 73 functions as a pilot light.

Figure 6:
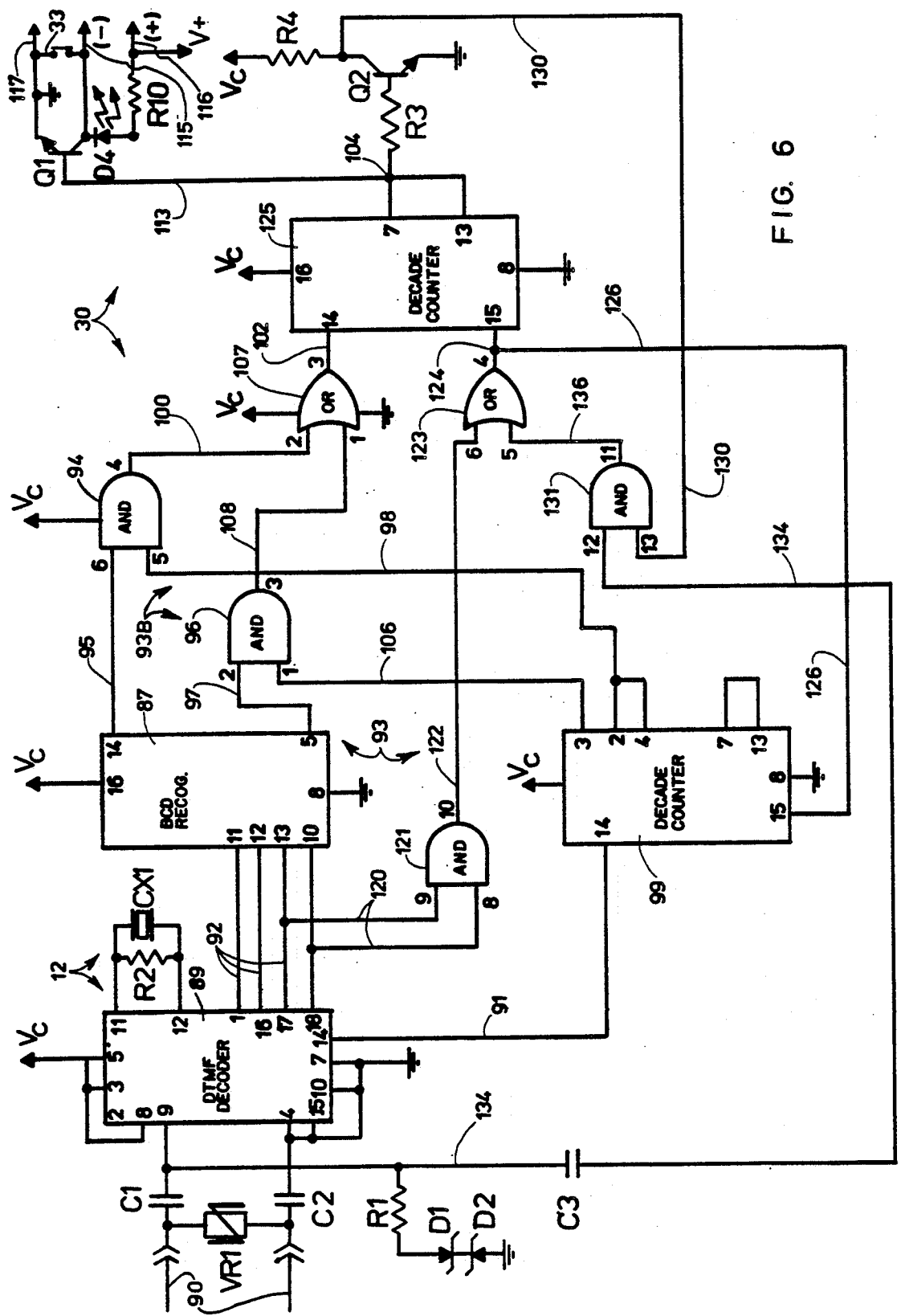
FIG. 6 is an electrical schematic diagram of the preferred phone line logic circuit.

With primary reference now directed to FIG. 6, the phone line logic circuit 30 monitors and responds to telephone number sequences. Circuit 30 may be interconnected via a conventional jack across the conventional phone lines 90. Ideally the circuit will comprise an added jack in parallel with lines 90 so that the telephone 36 described in FIG. 2 may simply be plugged into the back of the control box. The phone line is connected to a DTMF decoder 89 via isolating capacitors C1 and C2 which lead to pins 9 and 4 of decoder 89. Tone signals are thus inputted across pins 4 and 9 of decoder 89. Binary coded decimal signals are outputted from 89 along lines 92 and are transmitted to an initiation circuit, generally designated by the reference numeral 93, which processes BCD data. To use circuit 30 on an older pulse-dialing telephone line, a pulse sensitive decoder could be substituted for 89.

Initiation circuit 93 comprises a BCD recognition circuit 87 interconnected with decoder 89 via lines 92, and a counter 99. BCD recognition circuit 87 recognizes the occurrence of specific digits within the desired alarm, reset, and test sequences, and it is connected with a gate logic circuit generally designated by the reference numeral 93B. Decoder 89 strobes initiation circuit 93, outputting a strobe signal on line 91 which is transmitted to pin 14 of counter 99. A digital pulse occurs on line 91 each time a digit is dialed, and, in response to strobing, counter circuit 99 goes high on specific pins corresponding to the dialing order. For example, pin 3 goes high when any first digit of any sequence is dialed, and pins 2 and 4 sequentially go high when any second and third digits follow.

Pins 5 and 14 of recognition circuit 87 are coupled to the gate circuit 93B. Pin 14 is interconnected with AND gate 94 by line 95, and pin 5 is interconnected with AND gate 96 via line 97. Line 97 goes high whenever a "9" is dialed, and line 95 goes high whenever the digit "1" occurs. Pin 5 of AND gate 94 is connected via line 98 to pins 2 and 4 of counter 99. Pin 3 of counter 99 transmits a pulse on line 106 in response to the first strobe pulse delivered to its pin 14. Pins 2 and 4 of counter 99 transmit a pulse respectively corresponding to a second and third pulses strobed on line 91, and the latter signal is delivered to AND gate 94 via line 98.

AND gate 96 normally senses when a "9" is the first digit of a sequence. For this to occur, lines 97 and 106 must be high, and as explained, line 97 will go high only when a "9" is transmitted. However, line 106 will only go high upon the occurrence of the first digit of a sequence. When "9" is first, AND gate 96 will output a first initiation pulse on line 108 which is transmitted to pin 1 of OR gate 107. When pulsed on either line 100 or 108, OR gate 107 will pulse line 102 and pin 14 of an incrementer 125. When incremented three times at pin 14, 125 outputs on pin 7 to node 104.

If any dialed digit is a "1", line 95 will go high. When the second digit occurs, pin 2 of counter 99 will go high, transmitting a pulse to pin 5 of AND gate 94 via line 98. AND gate 94 thus applies a second initiation pulse on line 100 when the second dialed digit is a "1". Hence OR gate 107 will increment 125 a second time on line 102.

Figure 7:
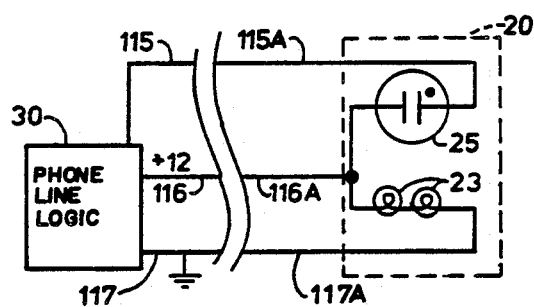
FIG. 7 is a block diagram of the phone line logic circuit interconnected with the address light; and, FIG. 8 is an enlarged, fragmentary, sectional view of the preferred address light, with portions broken away or shown in section for clarity or omitted for brevity.

When the third digit occurs, pin 4 of counter 99 will pulse AND gate 94 via line 98. If the third digit is a "1", then line 95 will also be high, and a third initiation pulse will be transmitted to OR gate 107 via line 100. Since line 102 will again be forced high, incrementer 125 will be incremented a third time, and node 104 will be forced high. Once node 104 goes high, transistor Q1 is turned on via line 113. This in effect grounds line 115, which, as seen in FIG. 7, is interconnected with line 115A. When line 115A is grounded, a strobe 25 may be activated by the voltage appearing on lines 116 and 116A. It will also be noted that bulbs 23 are activated across line 116A and ground lines 117, 117A. Switch 33 will manually activate the strobe by grounding line 115.

Thus for an alarm condition to be transmitted, incrementer 125 must be incremented three times. The first incrementation occurs after logic lines 97 and 106 concurrently go high, corresponding to a "9" being dialed first. The second two incrementations occur when lines 95 and 98 concurrently go high, corresponding to the dialing of "1's" as the second and third digits of a dialing sequence. Thus when the emergency sequence is dialed, 125 will be incremented three times and the alarm will be activated. However, circuit 30 will also actuate the strobe alarm 25 when the test sequence #-9-1-1 is dialed.

The symbol "#" is the first digit of the reset and test sequences. When a "#" occurs, AND gate 121, which is coupled to pins 17 and 18 of decoder 89 via lines 120, will be activated, and a pulse will be applied along line 122 to OR gate 123. Gate 123 will provide a reset pulse on node 124 coupled to pin 15 of incrementer 125, which will thus be reset. Transistor Q1 will then be turned off, and the alarm will be reset. If an alarm sequence follows the symbol #, 125 will then activate transistor Q1 as previously described, to activate the alarm system. When gate 123 is activated, a reset pulse is also transmitted on line 126 to pin 15 of counter 99 to reset it. It will thereafter respond to the second, third and fourth digits of a test sequence as if they were the normal first, second, and third digits of an alarm sequence. Thus, when the test sequence #-9-1-1 is transmitted, 125 will ultimately treat the second, third, and fourth digits, (i.e. 9-1-1) as if they were the "normal"

first, second, and third digits respectively. The local phone company equipment will not recognize any digits subsequent to the symbol #. Circuit 30 thus activates an alarm in response to either an alarm sequence or a test sequence, and it deactivates the alarm in response to a reset sequence.

Transistor Q2 in effect keeps the alarm on after an emergency sequence or test sequence is dialed even though the dialer may subsequently hang up the telephone. Thus for example, after a 9-1-1 call is made, the dialer may hang up and then make a second and third calls to neighbors or friends and 125 will not be reset. However, the user can reset the circuit merely by dialing the reset sequence (i.e. the symbol # alone).

Line 130 couples the collector of transistor Q2 to AND gate 131. Line 130 is high as long as transistor Q2 is off. Gate 131 is also coupled to an off-hook pulse reset line 134. When pins 12 and 13 of gate 131 are both high, line 136 goes high to activate OR gate 123 to reset incrementer 125. Thus when the telephone is first picked up to dial out, and no emergency situation has hitherto occurred, transistor Q2 will be off. Line 130 will be high, and line 134 will go high when the telephone receiver is then lifted. Thus before any digits are dialed, incrementer 125 will be reset. Counter 99 will also be reset on line 126. However, after a call has been made to emergency service, the alarm will be activated as previously described. Transistor Q2 will be turned on by incrementer 125, and thus line 130 will go low. When line 130 is low, gate 131 cannot pulse line 136, notwithstanding signals received from the off-hook pulse reset line 134. Transistor Q2 and AND gate 131 can thus neutralize the effects of off-hook reset line 134. Subsequent telephone calls may thus be made after an emergency connection has been completed, without resetting the alarm.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An emergency condition signaling system which is responsive to outgoing calls made on a telephone line, said system comprising:
    an illuminated address light adapted to be disposed at a visible location;
    electronic circuit means for interconnection with said telephone line for generating an alarm signal in response to the sequential dialing of the digits comprising a preselected sequence by a telephone connected to said telephone line, said circuit means comprising:
        decoder means interconnected with said telephone line for outputting coded signals corresponding to the digits dialed by said telephone;
        initiation means responsive to said decoder means for generating a first initiation signal if the first digit dialed corresponds to the first digit of said predetermined sequence, and for generating successive initiation signals if the successive digits dialed correspond to successive digits of said predetermined sequence;
        incrementing means responsive to said first and successive initiation signals for outputting an alarm signal;
        off hook reset means for normally resetting said initiation means and said incrementing means whenever a call is made by said telephone; and,
        means for preventing reset of said initiation means and said incrementing means when said predetermined sequence has been dialed and hang up of the telephone occurs immediately thereafter;
    alarm means activated by said electronic circuit means for signaling for assistance, said alarm means disposed within said address light;
    whereby emergency personnel summoned by said preselected sequence will be attracted by said system.

2. The system as defined in claim 1 wherein said circuit means comprises means for preventing reset of said alarm means when said predetermined sequence has been dialed, the connection has been broken, and a second call is then made so as to preserve the alarm state during the second call.

3. The system as defined in claim 2 wherein said circuit means comprises means for resetting said incrementing means in response to a predetermined test digit.

4. The system as defined in claim 3 including means responsive to said decoder means for resetting said initiation means and said incrementing means when said predetermined test digit is dialed.

5. The system as defined in claim 3 wherein said circuit means comprises means for disabling said off hook reset means when said predetermined sequence has been dialed and hang up of the telephone occurs immediately thereafter.

6. The system as defined in claim 5 wherein said initiation means comprises:
    recognition means interconnected with said decoder means for recognizing the dialing of digits;
    counter means for determining the order that digits have been dialed; and,
    gate means responsive to both said recognition means and said counter means for triggering said incrementing means each time a correct dialed digit occurs in a correct order.

7. The system as defined in claim 6 wherein said gate means comprises:
    AND gate means directly receiving inputs from said recognition means and said counter means; and,
    OR gate means receiving inputs from said AND gate means and outputting to said incrementing means.

8. An emergency condition signaling system which is responsive to outgoing calls made on a telephone line, said system comprising:
    electronic circuit means for interconnection with said telephone line for generating an alarm signal in response to the sequential dialing of the alarm sequence 9-1-1 by a telephone connected to said telephone line, said circuit means comprising test sequence means for responding to the test sequence #-9-1-1 to facilitate testing of said system without completing an emergency phone call;
    an illuminated address light adapted to be remotely installed at a convenient visible location;

alarm means associated with said address light and activated by said electronic circuit means for signaling for assistance;

whereby emergency personnel summoned by said alarm sequence can be attracted by said address light.

9. The system as defined in claim 8 wherein said electronic circuit means comprises:
decoder means interconnected with said telephone phone line for outputting coded signals corresponding to the digits dialed by said telephone;
initiation means responsive to said decoder means for generating a first initiation signal if the first digit dialed was a 9, and for generating second and third initiation signals if the subsequent digits dialed were both 1; and,
incrementing means responsive to said first, second, and third initiation signals for outputting an alarm signal.

10. The system as defined in claim 9 wherein said circuit means comprises off-hook reset means for normally resetting said initiation means and said incrementing means whenever a call is made by said telephone.

11. The system as defined in claim 9 wherein said circuit means comprises means for preventing reset of said initiation means and said incrementing means when an alarm sequence has been dialed and hang up of the telephone occurs immediately thereafter.

12. The system as defined in claim 9 wherein said circuit comprises test sequence means for responding to the test sequence #-9-1-1 to facilitate testing of said system without completing an emergency phone call.

13. The system as defined in claim 12 wherein said circuit means comprises:
off-hook reset means for normally resetting said initiation means and said incrementing means whenever a call is made by said telephone; and,
means for disabling said off-hook reset means when an alarm sequence has been dialed and hang up of the telephone occurs immediately thereafter.

14. The system as defined in claim 12 wherein said test sequence means comprises means responsive to said decoder means resetting said initiation means and said incrementing means with the digit # is dialed.

15. The system as defined in claim 12 wherein said initiation means comprises:
recognition means interconnected with said decoder means recognizing the dialing digits 9 or 1;
counter means for determining the order that digits have been dialed; and,
gate means responsive to both said recognition means and said counter means for triggering said incrementing means each time when the sequence 9-1-1 is dialed.

16. The system as defined in claim 15 wherein said gate means comprises:
AND gate means directly receiving inputs from said recognition means and said counter means; and,
OR gate means receiving inputs from said AND gate means an outputting to said incrementing means.

17. An emergency condition signaling system responsive to outgoing calls made on a telephone line, said emergency signaling system comprising:
electronic circuit means for interconnection with said telephone line for generating an alarm signal in response to the sequential dialing of the digits comprising a preselected sequence by a telephone connected to said telephone line, said electronic circuit means comprising:
decoder means interconnected with said telephone phone line for outputting coded signals corresponding to the digits dialed by said telephone;
initiation means responsive to said decoder means for generating a first initiation signal if the first digit dialed corresponded to the first digit of said predetermined sequence, and for generating successive initiation signals if the successive digits dialed corresponded to successive digits of said predetermined sequence;
incrementing means responsive to said first and successive initiation signals for outputting an alarm signal;
means for resetting said incrementing means in response to a predetermined test digit;
means responsive to said decoder means for resetting said initiation means and said incrementing means when said predetermined test digit is dialed;
off hook reset means for normally resetting said initiation means and said incrementing means in response to the telephone going off-hook; and,
means for disabling said off hook reset means when said predetermined sequence has been dialed and hang up of the telephone occurs immediately thereafter; and,
alarm means activated by said electronic circuit means for signaling for assistance.

18. An emergency condition signaling system which is responsive to outgoing calls made on a telephone line, said system comprising:
electronic circuit means for interconnection with said telephone line for generating an alarm signal in response to the sequential dialing of the alarm sequence 9-1-1 by a telephone connected to said telephone line, said electronic circuit means comprising:
decoder means interconnected with said telephone phone line for outputting coded signals corresponding to the digits dialed by said telephone;
initiation means responsive to said decoder means for generating a first initiation signal if the first digit dialed was a 9, and for generating second and third initiation signals if the subsequent digits dialed were both 1;
incrementing means responsive to said first, second, and third initiation signals for outputting an alarm signal; and,
means for preventing reset of said initiation means and said incrementing means when an alarm sequence has been dialed and hang up of the telephone occurs immediately thereafter;
an illuminated address light adapted to be remotely installed at a convenient visible location; and,
alarm means associated with said address light and activated by said electronic circuit means for signaling for assistance;
whereby emergency personnel summoned by said alarm sequence can be attracted by said address light.

19. An emergency condition signaling system which is responsive to outgoing calls made on a telephone line, said system comprising:
electronic circuit means for interconnection with said telephone line for generating an alarm signal in response to the sequential dialing of the alarm sequence 9-1-1 by a telephone connected to said telephone line, said electronic circuit means comprising:

decoder means interconnected with said telephone phone line for outputting coded signals corresponding to the digits dialed by said telephone;

initiation means responsive to said decoder means for generating a first initiation signal if the first digit dialed was a 9, and for generating second and third initiation signals if the subsequent digits dialed were both 1;

incrementing means responsive to said first, second, and third initiation signals for outputting an alarm signal; and test sequence means for responding to the test sequence #-9-1-1 to facilitate testing of said system without completing an emergency phone call;

an illuminated address light adapted to be remotely installed at a convenient visible location; and, alarm means associated with said address light and activated by said electronic circuit means for signaling for assistance;

whereby emergency personnel summoned by said alarm sequence can be attracted by said address light.

* * * * *